United States Patent
Edwards et al.

(10) Patent No.: US 12,554,922 B2
(45) Date of Patent: Feb. 17, 2026

(54) ENTITY NAME AUDIO-TO-TEXT TRANSLATION

(71) Applicant: Capital One Services, LLC, McLean, VA (US)

(72) Inventors: Joshua Edwards, Philadelphia, PA (US); Benjamin Eng, Silver Spring, MD (US); Kok Leong Seow, New York, NY (US)

(73) Assignee: Capital One Services, LLC, McLean, VA (US)

( * ) Notice: Subject to any disclaimer, the term of this patent is extended or adjusted under 35 U.S.C. 154(b) by 357 days.

(21) Appl. No.: 18/364,537

(22) Filed: Aug. 3, 2023

(65) Prior Publication Data

US 2025/0045509 A1     Feb. 6, 2025

(51) Int. Cl.
*G06F 40/166*     (2020.01)
*G06F 40/295*     (2020.01)
*G06F 40/30*      (2020.01)

(52) U.S. Cl.
CPC .......... *G06F 40/166* (2020.01); *G06F 40/295* (2020.01); *G06F 40/30* (2020.01)

(58) Field of Classification Search
CPC ....... G06F 40/166; G06F 40/295; G06F 40/30
See application file for complete search history.

(56) References Cited

U.S. PATENT DOCUMENTS

| | | | |
|---|---|---|---|
| 2011/0137636 A1* | 6/2011 | Srihari | G06F 40/53 704/2 |
| 2014/0297252 A1* | 10/2014 | Prasad | G10L 15/01 704/2 |
| 2015/0088508 A1* | 3/2015 | Bharadwaj | G10L 15/063 704/237 |
| 2018/0233145 A1* | 8/2018 | Bathiche | H04L 63/102 |
| 2020/0143814 A1* | 5/2020 | Moniz | G10L 17/06 |
| 2022/0012470 A1* | 1/2022 | Koishida | H04N 7/181 |
| 2023/0325217 A1* | 10/2023 | Balaram | G06F 16/245 715/708 |
| 2023/0325612 A1* | 10/2023 | Ghatage | G06F 40/263 |
| 2024/0274122 A1* | 8/2024 | Wang | G10L 15/16 |
| 2024/0314158 A1* | 9/2024 | Bourzikas | H04L 63/1441 |

OTHER PUBLICATIONS

Named Entity Recognition Sudoh et al (Year: 2009).*

* cited by examiner

*Primary Examiner* — Anil K Bhargava
(74) *Attorney, Agent, or Firm* — Harrity & Harrity, LLP

(57) ABSTRACT

In some implementations, a device may obtain an audio input. The device may perform an audio-to-text operation to translate the audio input into a first text output. The device may detect that a first portion of the first text output is to be modified to include an entity name. The device may perform, using an identifier of a source of the audio input, a lookup operation to identify the entity name. The device may modify the first text output to obtain a second text output by replacing the first portion with the entity name.

20 Claims, 8 Drawing Sheets

ENTITY NAME AUDIO-TO-TEXT TRANSLATION

BACKGROUND

Audio-to-text (sometimes referred to as voice-to-text or speech recognition) assists in the conversion of human speech into a text transcript. Audio or video files can be transcribed into text automatically via a device. For example, with speech recognition technology, the device can automatically convert audio to text transcripts. Compared to audio data, a text transcript is searchable, uses less computer memory, and/or can be used as an alternate method of communication, such as for closed captions.

SUMMARY

Some implementations described herein relate to a system for entity name audio-to-text translation. The system may include one or more memories and one or more processors communicatively coupled to the one or more memories. The one or more processors may be configured to perform an audio-to-text operation to translate an audio input into a first text output. The one or more processors may be configured to detect, based on the first text output and using named entity recognition, that a first portion of the first text output is associated with an entity name, wherein the first portion includes one or more words associated with a confidence score that does not satisfy a confidence threshold, and wherein the confidence threshold indicates a likelihood that the audio-to-text operation correctly translated the first portion from the audio input. The one or more processors may be configured to determine, using an identifier of a source of the audio input, the entity name. The one or more processors may be configured to modify the first text output to obtain a second text output by replacing the first portion with the entity name. The one or more processors may be configured to provide, for display, the second text output.

Some implementations described herein relate to a method of entity name audio-to-text translation. The method may include obtaining, by a device, an audio input. The method may include performing, by the device, an audio-to-text operation to translate the audio input into a first text output. The method may include detecting, by the device based on the first text output, that a first portion of the first text output is to be modified to include an entity name. The method may include performing, by the device and using an identifier of a source of the audio input, a lookup operation to identify the entity name. The method may include modifying, by the device, the first text output to obtain a second text output by replacing the first portion with the entity name.

Some implementations described herein relate to a non-transitory computer-readable medium that stores a set of instructions. The set of instructions, when executed by one or more processors of a device, may cause the device to perform an audio-to-text operation to translate an audio input into a first text output. The set of instructions, when executed by one or more processors of the device, may cause the device to detect, based on the first text output and using named entity recognition, that a first portion of the first text output is associated with an entity name, wherein the first portion includes one or more words associated with a confidence score that does not satisfy a confidence threshold, and wherein the confidence threshold indicates a likelihood that the audio-to-text operation correctly translated the first portion from the audio input. The set of instructions, when executed by one or more processors of the device, may cause the device to determine, using an identifier of a source of the audio input, the entity name. The set of instructions, when executed by one or more processors of the device, may cause the device to modify the first text output to obtain a second text output by replacing the first portion with the entity name. The set of instructions, when executed by one or more processors of the device, may cause the device to provide, for display, the second text output.

DETAILED DESCRIPTION

Figure 1A:
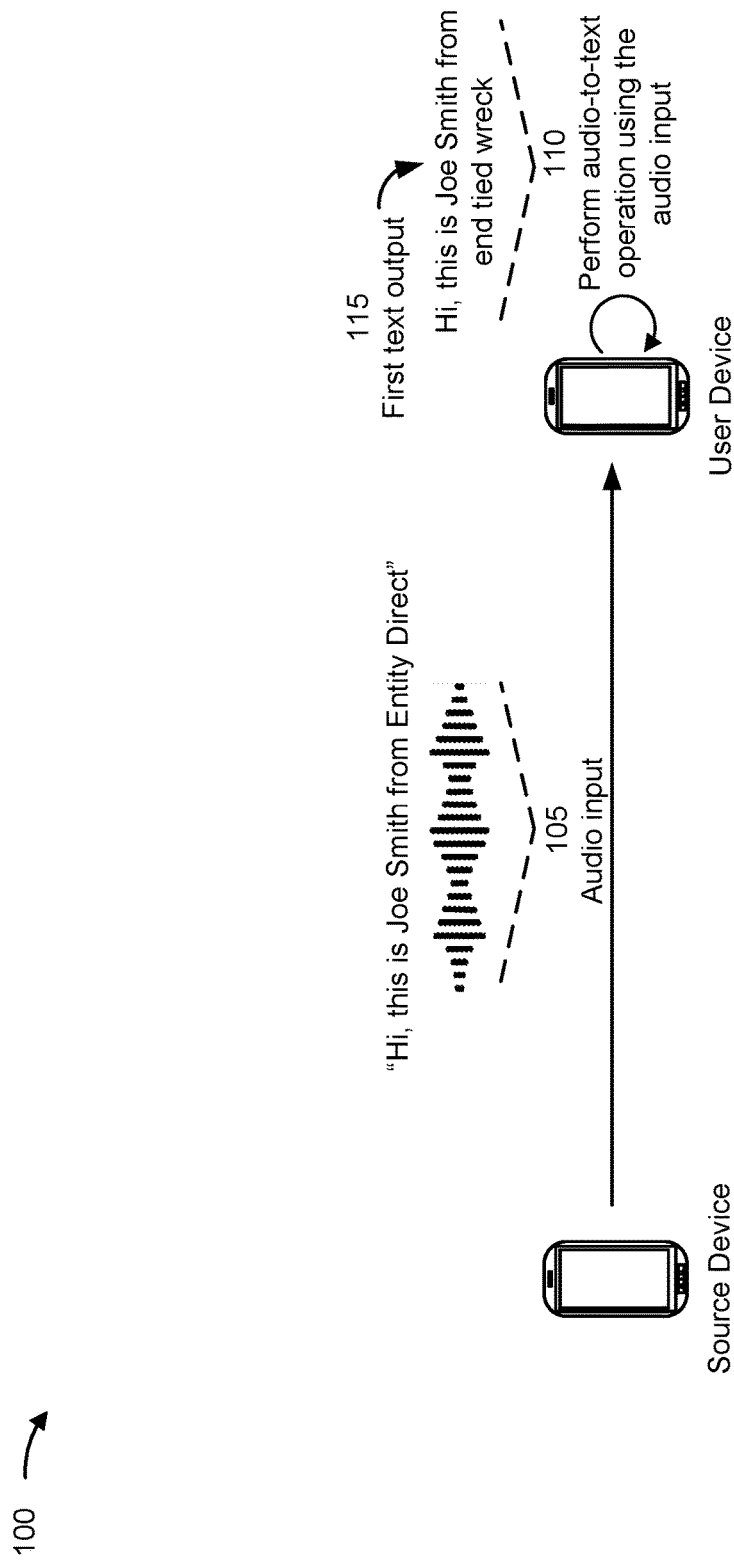
FIGS. 1A-1D are diagrams of an example associated with entity name audio-to-text translation, in accordance with some embodiments of the present disclosure.

The following detailed description of example implementations refers to the accompanying drawings. The same reference numbers in different drawings may identify the same or similar elements.

A device may perform audio-to-text translation (sometimes referred to as voice-to-text translation, speech-to-text translation, speech recognition, automatic speech recognition, and/or computer speech recognition) to convert or translate audio data into text data. For example, the device may translate spoken words in the audio data into text. For example, the device may perform audio-to-text translation for transcribing spoken words, transcribing voicemail messages, and/or creating closed captioning text, among other examples.

In some cases, the device may incorrectly translate some words from audio to text. For example, the device may use acoustic modeling to correlate audio features (e.g., frequency and duration of audio sounds) with text. For example, the device may use a deep neural network that is trained using a dataset of labeled audio recordings and their corresponding transcriptions. The deep neural network may learn to recognize the acoustic patterns of speech sounds and the probability of different sequences of sounds occurring in spoken language. However, the model (e.g., the deep neural network) used by the device may be biased toward more common words. For example, where two or more words have similar audio features (e.g., where two or more words sound similar when spoken), the model may determine that the audio features correspond to the more common word among the two or more words. This may result in incorrect audio-to-text translations when less common words are included in the audio data. As an example, the device may frequently incorrectly translate entity names (e.g., names of an entity, business, or merchant) because the entity names are less commonly used in typical speech. The device may incorrectly translate the entity names to more common words when performing audio-to-text translation of the entity names. This may result in the device outputting an incorrect text translation of the audio data. Generating an incorrect text translation may consume resources (e.g., computing resources, processing resources, memory resources, and/or network resources) associated with reanalyzing the audio data, rerecording or providing for a second time the audio data for analysis, and/or correcting the inaccuracies in the original audio-to-text translation, among other examples.

Some implementations described herein enable improved audio-to-text translations (or conversions) for audio that includes an entity name. For example, a device may obtain audio data (e.g., an audio input). The audio data may be associated with a voice call, a voice message, a voicemail message, a recording, and/or a video, among other examples. The device may perform an audio-to-text operation to translate the audio data into a first text output (e.g., converting or translating words in the audio data into text). The device may detect that a portion of the first text output is associated with an entity name (e.g., includes an entity name). For example, the device may use a named entity recognition (NER) model to detect that the first text output includes an entity name. The device may determine that the portion of the first text output did not correctly translate the entity name when performing the audio-to-text operation. For example, the device may detect that the portion includes one or more words associated with a confidence score that does not satisfy a confidence threshold (e.g., where the confidence threshold indicates a likelihood that the audio-to-text operation correctly translated the portion from the audio data).

The device may determine the entity name. For example, the device may determine the entity name using an identifier of a source (e.g., a source device) of the audio data. For example, the source may be a caller (e.g., where the audio data is a voice call or a voicemail message), and/or a name or other identifier of a speaker (e.g., where the audio data is associated with a video call or a video), among other examples. The identifier may be a phone number, an email address, a name (e.g., a username), and/or an internet protocol (IP) address, among other examples. For example, the device may perform a lookup operation associated with an entity name database (e.g., may search the entity name database) using the identifier. The entity name database may include entries associated with entity names and respective identifiers. As another example, the device may transmit, to another device, an indication of the identifier (e.g., via an application programming interface (API) call). The device may receive, from the other device, an indication of the entity name (e.g., in response to transmitting the indication of the identifier).

The device may modify the first text output to obtain a second text output by replacing the portion (e.g., of the first text output that was determined to include or be associated with an entity name) with the determined entity name associated with the source of the audio data. In some implementations, the device may determine whether the modified text output (e.g., the second text output) is similar to the audio data. For example, the device may obtain or determine a first audio signal associated with the entity name (e.g., indicating audio data associated with the entity name if the entity name were to be spoken or output as audio). The device may compare the first audio signal to a portion of the audio data corresponding to the portion of the first text output (e.g., that was determined to include or be associated with an entity name) to obtain a similarity score. The device may modify the first text output is based on the similarity score satisfying a similarity threshold (e.g., based on the entity name having a similar audio sound as the portion of the audio data that is determined to include an entity name). The device may provide, for display, the second text output (e.g., the modified text output).

As a result, an accuracy of the audio-to-text translation or conversion may be improved. For example, the device may be enabled to improve the audio-to-text translation by automatically identifying that an entity name should be included in a text output of audio-to-text translation and identifying the entity name to be included in the text output. Improving the accuracy of the audio-to-text translation may improve a user experience and/or may enable the device to perform improved operations using the text output, such as searching the text output, and/or using the text output for communication (e.g., for generating closed captions). In some implementations, the device may use a single model (e.g., a single machine learning model) for performing the audio-to-text translation and detecting that the text output of an audio-to-text translation includes an entity name (e.g., the model may be a multi-task model that is trained to perform the audio-to-text translation and NER). This improves the efficiency of the audio-to-text translations for audio that includes an entity name and/or conserves resources (e.g., computing resources, processing resources, and/or memory resources) that would have otherwise been used to perform the audio-to-text translations for audio that includes an entity name using multiple models (e.g., a first model for an audio-to-text operation and a second model for NER).

FIGS. 1A-1D are diagrams of an example 100 associated with entity name audio-to-text translation. As shown in FIGS. 1A-1D, example 100 includes a source device, a user device, a server device, and an entity name database. These devices are described in more detail in connection with FIGS. 3 and 4.

As shown in FIG. 1A, and by reference number 105, the user device may obtain an audio input. The user device may obtain the audio input from the source device (e.g., the source device may provide or transmit the audio input to the user device). In some other implementations, the user device may obtain the audio input from a memory of the user device and/or from a server device. The audio input may include audio data (e.g., an audio file), analog audio data, digital audio data, streaming audio data, and/or voice over IP (VoIP) data, among other examples. The audio input may be referred to as audio data, an audio signal, sound data, and/or voice data, among other examples. In some implementations, the audio input may be associated with a voice call (e.g., a phone call associated with the source device), a conversation, a recording, an audio command (e.g., spoken by a user of the user device), a voicemail message, a video call (e.g., a call associated with a videoconferencing platform), and/or a video (e.g., a movie or television show), among other examples.

For example, as shown in FIG. 1A, the audio input may include one or more words in an audio format (e.g., spoken by a user or output by a device). As an example, the audio input may be "Hi, this is Joe Smith from Entity Direct" in an audio format (e.g., spoken by a user, output by a device, or otherwise in an audio format).

As shown by reference number 110, the user device may perform an audio-to-text operation using the audio input. For example, the user device may perform an audio-to-text operation to translate or convert the audio input into a first text output 115. In some implementations, the user device may provide the audio input to a machine learning model (e.g., a speech recognition model or another machine learning model that is trained to convert audio into text). For example, the machine learning model may be deployed using cloud computing resources (e.g., the machine learning model may be deployed in a cloud computing environment). The user device may provide the audio input to the machine learning model (e.g., via the cloud computing environment) and may obtain the first text output 115 from the machine learning model (e.g., via the cloud computing environment). In some implementations, the user device may provide the audio input to another device, such as the server device. The user device may obtain, from the other device, the first text output 115 (e.g., where the other device performs the audio-to-text operation).

For example, the audio-to-text operation may include pre-processing the audio input to remove background noise and/or to enhance a signal associated with the words of the audio input, such as by filtering, normalization, and/or feature extraction, among other examples. In some implementations, the audio-to-text operation may include transforming an audio waveform (e.g., associated with the audio input) into a sequence of numerical features that can be used as an input to the machine learning model. The machine learning model may predict a probability of each word in the first text output 115 based on the context of the surrounding words. For example, the machine learning model may search through a set of possible word sequences to find the most likely transcription based on the audio input and a language model (e.g., an acoustic model that may be used to map the input audio features to a sequence of phonemes, which may be a unit of sound that can distinguish one word from another in a particular language).

As shown in FIG. 1A, the first text output 115 may be "Hi, this is Joe Smith from end tied wreck." For example, the user device and/or the machine learning model may translate the audio signal of the words "Hi, this is Joe Smith from Entity Direct" to the text of "Hi, this is Joe Smith from end tied wreck." For example, using audio features and/or a language model, the user device and/or the machine learning model may determine that the most likely words associated with an audio signal of "entity direct" are "end tied wreck."

Figure 1B:
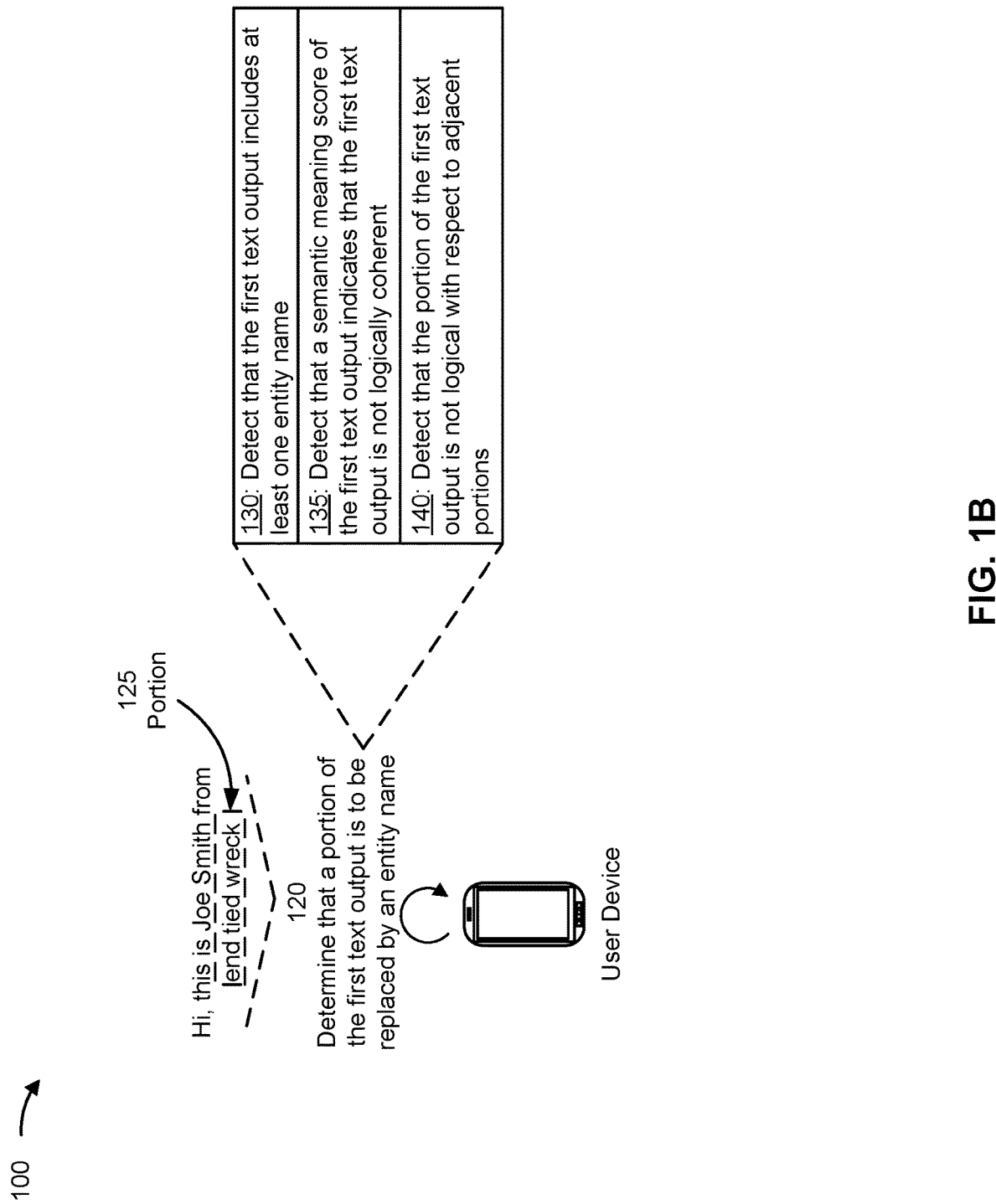

As shown in FIG. 1B, and by reference number 120, the user device may determine that a portion 125 of the first text output 115 is to be replaced by an entity name. For example, the user device may determine that the portion 125 is to be replaced by an entity name based on the first text output 115 having a probability (e.g., a high probability) of including an entity name (e.g., any entity name) and that the first text output 115 is not logically coherent, as explained in more detail below.

For example, as shown by reference number 130, the user device may detect that the first text output 115 includes at least one entity name. The user device may detect, via NER, that the first text output includes at least one entity name. For example, the user device may provide the first text output 115 to an NER model. In some implementations, the NER model may be, or may be included in, the machine learning model associated with performing the audio-to-text operation, as described in more detail in connection with FIG. 2. Detecting that the portion 125 of the first text output 115 is to be modified to include the entity name may be based on detecting that the first text output 115 includes at least one entity name. In other words, if the user device determines that the first text output 115 does not include any entity names, then the user device may not modify the first text output 115 as described elsewhere herein. This may conserve processing resources, computing resources, and/or memory resources, among other examples, that would have otherwise been associated with performing operations described herein for a text output that does not include any entity names.

NER may be a natural language processing task that involves identifying and/or classifying entities such as names of people, organizations, locations, and/or dates from a given text. For example, the user device may process the first text output 115 to remove unnecessary characters (e.g., punctuation or other characters), convert all letters to lowercase, and/or tokenize the first text output 115 into individual words or phrases. The user device may extract features from the first text output 115 that can be used to classify entities. The features may include part-of-speech tags, dependency trees, word embeddings, and/or contextual features, among other examples. The user device may use an NER model (e.g., using a classification algorithm), such as a conditional random field (CRF) or a recurrent neural network (RNN), to classify each word or phrase in the first text output 115 as belonging to a specific entity type or as non-entity. For example, the NER model may be trained using a training data set including annotated text where each entity in the text is labeled with its corresponding type. The NER model may be trained to learn the relationship between input text and an output entity types using machine learning algorithms, such as supervised learning or semi-supervised learning.

As an example, based on the context of the first text output 115 and the semantic meaning of other words included in the first text output 115, the user device may determine that the portion 125 of the first text output 115 is associated with an entity name, For example, the NER model may determine that the portion 125 has an entity name score that satisfies an entity name threshold, where the entity name score indicates a likelihood that the portion 125 of the first text output 115 is associated with an entity name.

Additionally, or alternatively, determining that the portion 125 of the first text output 115 is to be replaced by an entity name may be based on the first text output 115 not being logically coherent. For example, the user device may determine that the portion 125 includes one or more words associated with a confidence score that does not satisfy a confidence threshold. The confidence score may indicate a likelihood that the audio-to-text operation correctly translated the portion 125 from the audio input. For example, the user device may determine the confidence score based on a semantic meaning (or a semantic meaning score) of the first text output 115. The user device may determine that the portion 125 of the first text output 115 is to be replaced by an entity name based on the confidence score not satisfying the confidence threshold.

For example, as shown by reference number 135, the user device may detect that a semantic meaning score associated with the first text output 115 indicates that the first text output 115 is not logically coherent. For example, the user device may determine, via semantic analysis of the first text output 115, a semantic meaning score associated with the first text output 115. The semantic meaning score may indicate a confidence score that the semantic meaning of the first text output 115 is logically coherent (e.g., that the meaning of the first text output 115 makes sense logically). For example, the user device may analyze the meaning of words and phrases in the first text output 115 to identify how the words and phrases relate to each other and whether the words and phrases form a coherent and meaningful sequence.

For example, a machine learning model can determine if a text input makes sense logically by using natural language processing (NLP) techniques. One example technique used in NLP is semantic analysis, which may involve analyzing the meaning of words and their relationships to each other in a given text. Semantic analysis can be done through various methods, such as using pre-trained word embeddings, which are mathematical representations of words that capture their semantic and syntactic properties. Another technique used in NLP is syntactic analysis, which may involve analyzing the structure of a sentence to determine the grammatical correctness of the sentence. Syntactic analysis can be done using techniques such as parsing, which involves breaking down a sentence into its constituent parts, such as subject, verb, and object. To determine if a text input makes sense logically, a machine learning model can use both semantic and syntactic analysis techniques. For example, the machine learning model can analyze the relationships between words in the input text to determine if they are logically coherent. The machine learning model may check if the input text (e.g., the first text output 115) adheres to basic rules of grammar, such as subject-verb agreement or noun-pronoun agreement. In addition to these techniques, the machine learning model may also be trained on large datasets of text to learn patterns and common structures that are indicative of logical coherence. This can be done using various types of machine learning algorithms, such as neural networks, decision trees, or support vector machines.

For example, the user device may segment the first text output 115 into words and/or phrases based on the grammatical structure of the first text output 115. The user device may assign a part-of-speech tag (e.g., a noun tag, verb tag, an adjective tag, or another part-of-speech tag) based on the based on syntactic roles of respective words or phrases in the first text output 115. The user device may analyze the relationships between the words and/or phrases in the first text output 115 using dependency parsing. For example, the user device may identify the dependencies between words and/or phrases, such as subject-verb relationships, object-verb relationships, and/or adjective-noun relationships, to build a graph-based representation of the first text output 115. The user device may identify the semantic roles of the words and/or phrases in the first text output 115. For example, the user device may assign each word or phrase a semantic role, such as agent, patient, instrument, or location, based on the function of the word or phrase in the first text output 115. The user device may analyze the coherence of the text based on how well the different parts of the sentence fit together (e.g., to generate the semantic meaning score). For example, the user device may determine whether the semantic relationships between the words and phrases in the first text output 115 are consistent with the intended meaning of the first text output 115 based on the grammatical structure, part-of-speech tags, semantic roles, and/or relationships between words or phrases included in the first text output 115.

For example, the user device may determine that the first text output 115 is not logically coherent. As an example, based on the syntax and grammatical structure of the first text output 115, the user device may determine that a noun may be expected to logically follow the word "from" in the first text output 115. However, the user device may determine that the portion 125 (e.g., that follows the word "from" in the first text output 115) does not include a noun and/or is otherwise not coherent based on the syntax and grammatical structure of the first text output 115. For example, the user device may determine that the semantic meaning score of the first text output 115 does not satisfy a coherency threshold. The user device may determine that the portion 125 of the first text output 115 is to be replaced by an entity name based on the semantic meaning score not satisfying the coherency threshold.

In some implementations, the user device may replace the portion 125 with a generic entity name to determine whether the coherency of the first text output 115 is improved when the portion 125 is replaced with a generic entity name. The generic entity name may be a placeholder associated with indicating that the portion 125 now indicates an entity name. For example, the generic entity name be "entity" or another generic name or placeholder. The user device may modify, based on the semantic meaning score not satisfying the coherency threshold, the first text output 115 by replacing the first portion with a generic entity name. For example, the user device may modify the first text output 115 to be "Hi, this is Joe Smith from [entity]" where "[entity]" is the generic entity name. The user device may determine a semantic meaning score associated with the modified text output (e.g., in a similar manner as described elsewhere herein). The user device may determine whether the semantic meaning score associated with the modified text output satisfies the coherency threshold and/or whether a difference between the semantic meaning score associated with the modified text output and the semantic meaning score associated with the first text output 115 satisfies a coherency improvement threshold. For example, the user device may determine that the portion 125 of the first text output 115 is to be replaced by an entity name based on the semantic meaning score associated with the modified text output satisfying the coherency threshold and/or based on the difference between the semantic meaning score associated with the modified text output and the semantic meaning score associated with the first text output 115 satisfying the coherency improvement threshold. This conserves processing resources, computing resources, and/or memory resources that would have otherwise been used to perform operations or actions described herein for a text output that would not be more logically coherent when a portion (e.g., the portion 125) of the text output is replaced with an entity name.

Additionally, or alternatively, the user device may determine that the portion 125 of the first text output 115 is to be replaced by an entity name based on the portion 125 not being logical based on a position of the portion 125 in the first text output 115. For example, as shown by reference number 140, the user device may determine that the portion 125 of the first text output 115 is not logical with respect to adjacent portions of the first text output 115. An adjacent portion may be one or more words directly preceding and/or following the portion 125. For example, as shown in FIG. 1B, an adjacent portion with respect to the portion 125 may be the word "from" and/or the phrase "this is Joe Smith from." The user device may determine, based on comparing the portion 125 to one or more other portions of the first text output 115 that are adjacent to the first portion, one or more adjacency scores. The one or more adjacency scores may indicate a confidence level that the portion 125 and respective portions from the one or more other portions should be adjacent logically. The user device may determine an adjacency score based on dependencies between two portions of a text output, part-of-speech tags of the two portions of a text output, and/or grammatical structures of a text output, among other examples.

For example, comparing a semantic meaning of the phrase "this is Joe Smith from" and the portion 125 of "end tied wreck," the user device may determine that an adjacency score that indicates that the two portions are not logically coherent when adjacent within a text output. For example, the user device may determine that the adjacency score does not satisfy an adjacency threshold. The user device may determine that that the portion 125 of the first text output 115 is to be replaced by an entity name based on at least one adjacency score associated with the portion 125 not satisfying the adjacency threshold.

In other words, the user device may determine that the portion 125 of the first text output 115 is to be replaced by an entity name based on determining that the first text output 115 includes at least one entity name, based on determining that the first text output 115 is not logically coherent, and/or based on determining that the portion 125 is not logically placed within the first text output 115 (e.g., based on at least one adjacency score associated with the portion 125 not satisfying the adjacency threshold), among other examples. The user device may perform one or more operations described herein based on, or in response to, determining that the portion 125 of the first text output 115 is to be replaced by an entity name. For example, the user device may not perform or more operations described herein associated with modifying the first text output based on determining that the portion 125 of the first text output 115 is not to be replaced by an entity name. This conserves processing resources, computing resources, memory resources, and/or network resources that would have otherwise been associated with performing the operations for a text output that may not be improved by replacing the portion 125 with an entity name, as described elsewhere herein.

Figure 1C:
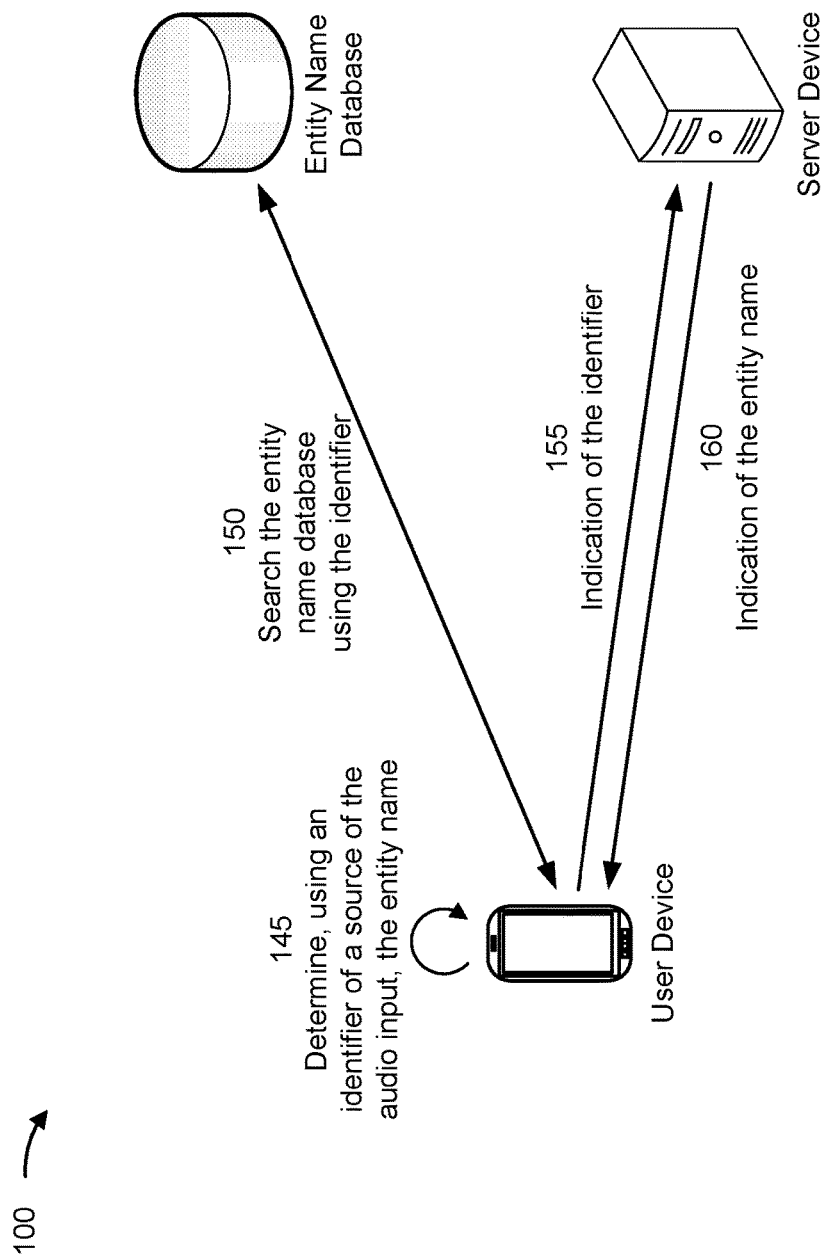

As shown in FIG. 1C, and by reference number 145, the user device may determine, using an identifier of a source of the audio input, the entity name. The source of the audio input may be the source device, a speaker (e.g., a person), or another device. The source may be a device associated with a speaker of the audio input. In other examples, the source may be a device that obtained or recorded the audio input (e.g., and provided the audio input to another device, such as the user device). The identifier may be a phone number, a username, a name, an IP address, and/or an email address, among other examples. For example, the audio input may be associated with a call (e.g., a voice call, a phone call, or a voicemail message). In such examples, the identifier may be a phone number of the calling device (e.g., the source device). In another example, the audio input may be associated with a video call or a videoconferencing platform. In such examples, the identifier may be associated with an account of a speaker, such as an email address, a username, and/or a name associated with the account. In another example, the audio input may be associated with a VoIP call. In such examples, the identifier may be an IP address of the calling device (e.g., the source device). In the example 100, the entity name associated with the identifier may be "Entity Direct."

For example, as shown by reference number 150, the user device may search the entity name database using the identifier to determine the entity name. For example, the entity name database may store entity names and respective identifiers. The entity name database may include a set of one or more entries. Each entry may be associated with an entity name and one or more identifiers associated with the entity name. The user device may perform a lookup operation, using the identifier, in the entity name database to identify the entity name. For example, the lookup operation may return an indication of the entity name that is associated with the identifier of the source of the audio input.

As another example, the user device may communicate with another device to determine the entity name. For example, as shown by reference number 155, the user device may provide, and a server device may obtain, an indication of the identifier. For example, the user device may provide the indication of the identifier via an API call. The server device may be associated with a service or platform that provides identifier information for different entities. For example, in response to obtaining the indication of the identifier, the server device may perform an operation (e.g., a lookup operation) to identify the entity name associated with the identifier. As shown by reference number 160, the server device may provide, and the user device may obtain or receive, an indication of the entity name (e.g., in response to the user device providing or transmitting the indication of the identifier).

Figure 1D:
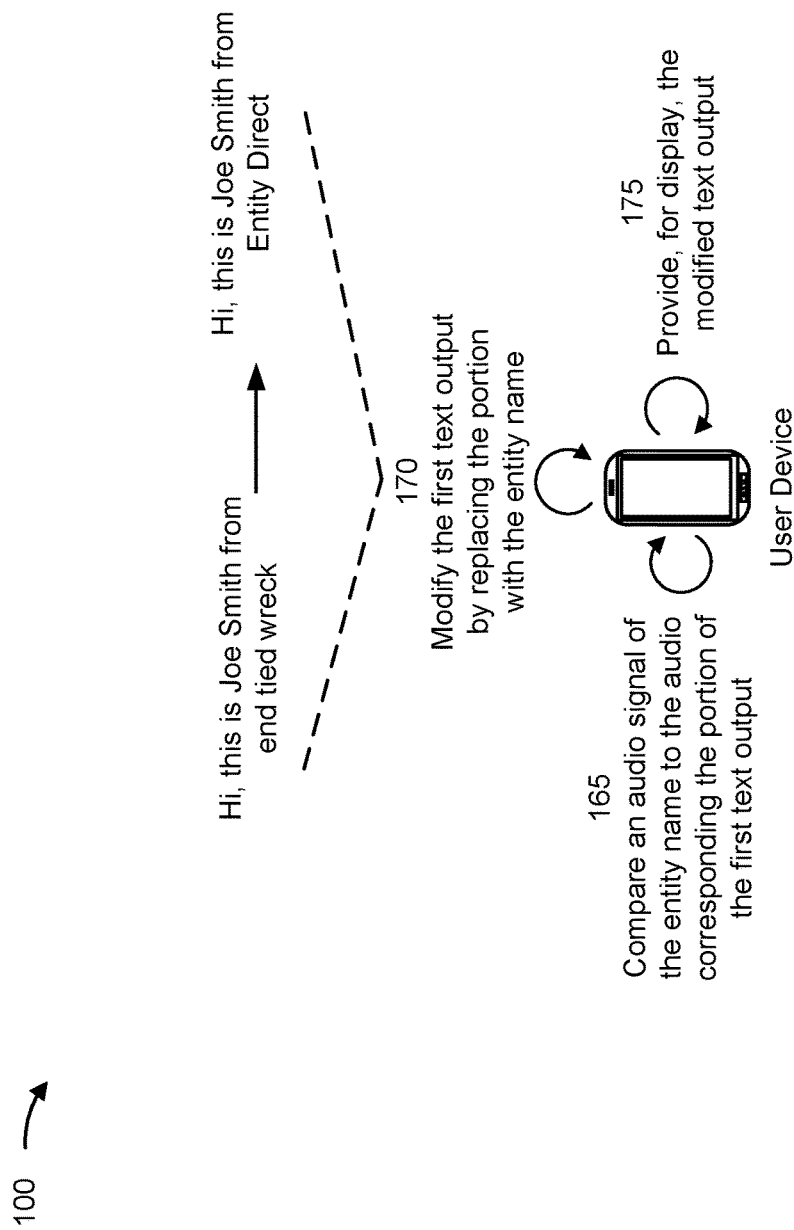

As shown in FIG. 1D, and by reference number 165, the user device may compare an audio signal of the entity name (e.g., that is determined and/or identified as described above in connection with FIG. 1C) to the audio corresponding to the portion 125 of the first text output 115. For example, the user device may confirm that the audio sound of the entity name is similar to the audio corresponding to the portion 125 of the first text output 115 (e.g., to ensure that the entity name should be added to the text output to replace the portion 125). For example, the user device may obtain or generate a first audio signal associated with the entity name. The user device may compare the first audio signal to a portion of the audio input corresponding to the portion 125 to obtain a similarity score. For example, the user device may compare features of the first audio signal to features of the portion of the audio input. The similarity score may indicate a level of similarity between the first audio signal and the portion of the audio input. In some implementations, the user device may proceed with modifying the first text output 115 based on similarity score satisfying a similarity threshold (e.g., based on the entity name sounding similar to the portion of the audio input corresponding to the portion 125 of the first text output 115). This improves a likelihood that the modification of the first text output 115 by the user device is correct.

As shown by reference number 170, the user device may modify the first text output 115 to obtain a second text output. For example, the user device may modify the first text output 115 by replacing the portion 125 with the entity name. As shown in FIG. 1C, the first text output 115 may be modified from "Hi, this is Joe Smith from end tied wreck" to "Hi, this is Joe Smith from Entity Direct." In some implementations, the user device may perform one or more operations to confirm that the second text output (e.g., "Hi, this is Joe Smith from Entity Direct") is accurate. For example, the user device may determine a semantic meaning score associated with the second text output (e.g., in a similar manner as described elsewhere herein). The user device may determine that the modification is correct based on the semantic meaning score associated with the second text output satisfying the coherency threshold (or another threshold).

As shown by reference number 175, the user device may provide, for display, the modified text output (e.g., the second text output). For example, the user device may cause an the second text output to be displayed via a display screen of the user device (e.g., via an application executing on the user device). Additionally, or alternatively, the user device may store (e.g., in one or more memories) the modified text output (e.g., the second text output). Additionally, or alternatively, the user device may transmit, to another device (such as the server device or another server device) an indication of the modified text output (e.g., the second text output). As a result, an accuracy of text output as part of an audio-to-text translation for audio that includes one or more entity names may be improved.

As indicated above, FIGS. 1A-1D are provided as an example. Other examples may differ from what is described with regard to FIGS. 1A-1D.

Figure 2:
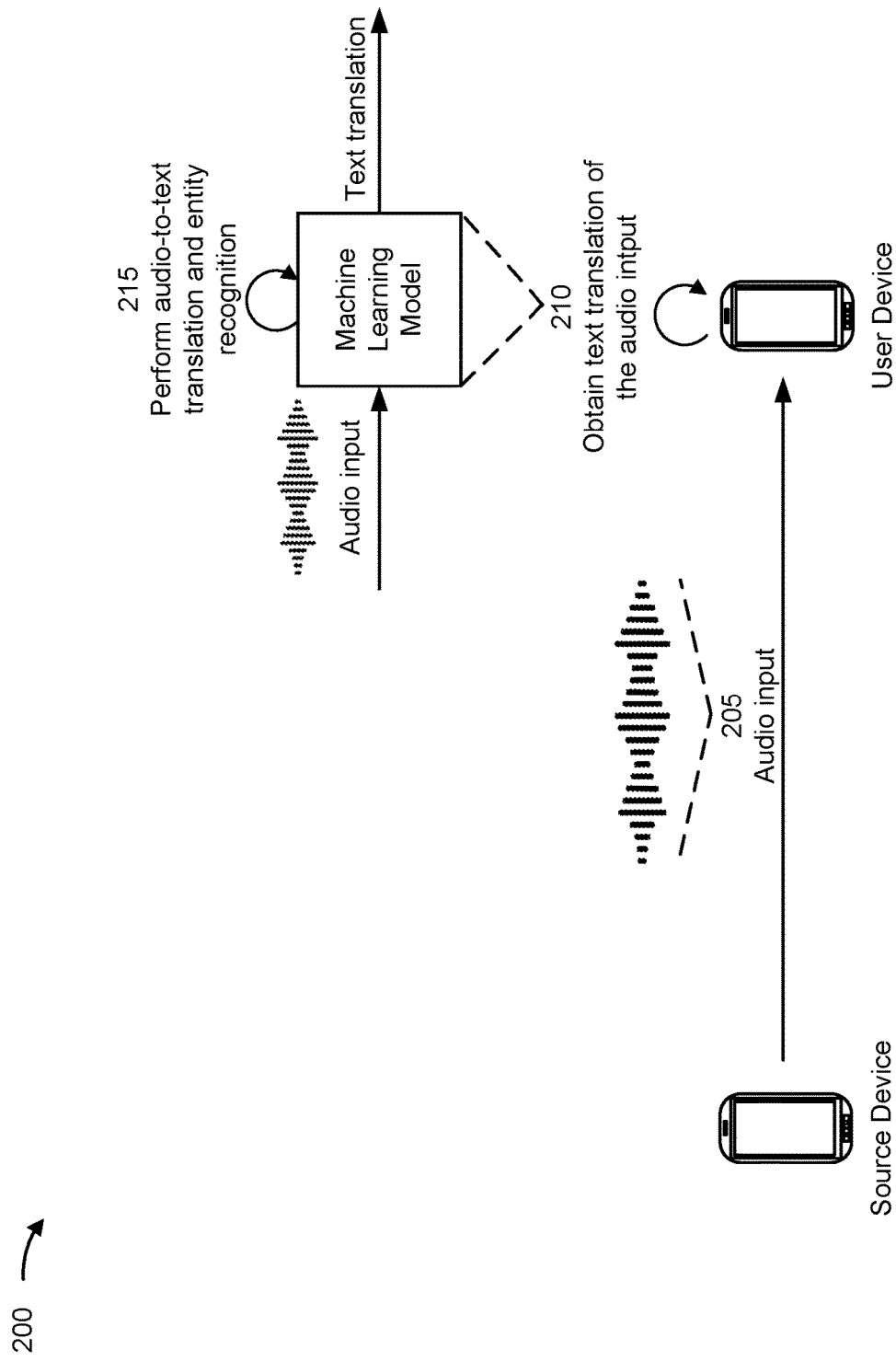
FIG. 2 is a diagram of an example associated with entity name audio-to-text translation, in accordance with some embodiments of the present disclosure.

FIG. 2 is a diagram of an example 200 associated with entity name audio-to-text translation. As shown in FIG. 2, example 200 includes a source device and a user device that deploys or utilizes a machine learning model. These devices are described in more detail in connection with FIGS. 3 and 4. The user device may be similar to the user device depicted in FIGS. 1A-1D.

As shown by reference number 205, the user device may obtain an audio input. The user device may obtain the audio input from the source device (e.g., the source device may provide or transmit the audio input to the user device). The user device may obtain the audio input in a similar manner as described in connection with FIG. 1A and reference number 105.

As shown by reference number 210, the user device may obtain and/or generate a text translation of the audio input using a machine learning model. The machine learning model may be similar to the machine learning model described in connection with FIGS. 1A-1D. The machine learning model may be deployed via the user device. As another example, the machine learning model may be deployed in a cloud computing environment.

The machine learning model may be a multi-task model. For example, the machine learning model may be trained to perform multiple tasks or operations described herein (e.g., via multi-task training). For example, as shown by reference number 215, the machine learning model may perform an audio-to-text translation of the audio input and perform entity recognition, in a similar manner as described elsewhere herein. For example, the user device may perform, via the machine learning model, the audio-to-text operation, such as the audio-to-text operation described in connection with FIG. 1A and reference number 110.

In some implementations, the user device may provide the audio input as an input to the machine learning model. In some implementations, the user device may perform, via the machine learning model, the audio-to-text operation using a spectrogram of the audio input. The spectrogram may be a visual representation of the spectrum of frequencies in the audio input over time. The spectrogram may show how the energy of different frequencies changes over time in the audio input. For example, in addition to time domain information or samples associated with the audio input, the user device may provide frequency domain information or samples associated with the audio input (e.g., as an input to the machine learning model).

Additionally, the user device may determine, via the machine learning model, the entity name using an identifier of the source of the audio signal in a similar manner as described in connection with FIGS. 1A-1D. For example, an input to the machine learning model may be the audio input and an output of the machine learning model may be the second text output described in connection with FIGS. 1A-1D (e.g., modified by replacing a portion of a text output with an entity name). For example, the machine learning model may be trained to convert an audio signal into text, to determine that a portion of the text is to be replaced with an entity name, to determine the entity name, and to modify the text to replace the portion with the entity name in a similar manner as described elsewhere herein, such as in connection with FIGS. 1A-1D. This improves the efficiency and/or decreases the complexity of the audio-to-text operation described herein because a single machine learning model may be used to perform the different tasks or operations. Additionally, this may conserve processing resources, network resources, and/or memory resources that would have otherwise been associated with providing inputs to multiple machine learning models and/or obtaining multiple outputs from multiple machine learning models.

As indicated above, FIG. 2 is provided as an example. Other examples may differ from what is described with regard to FIG. 2.

Figure 3:
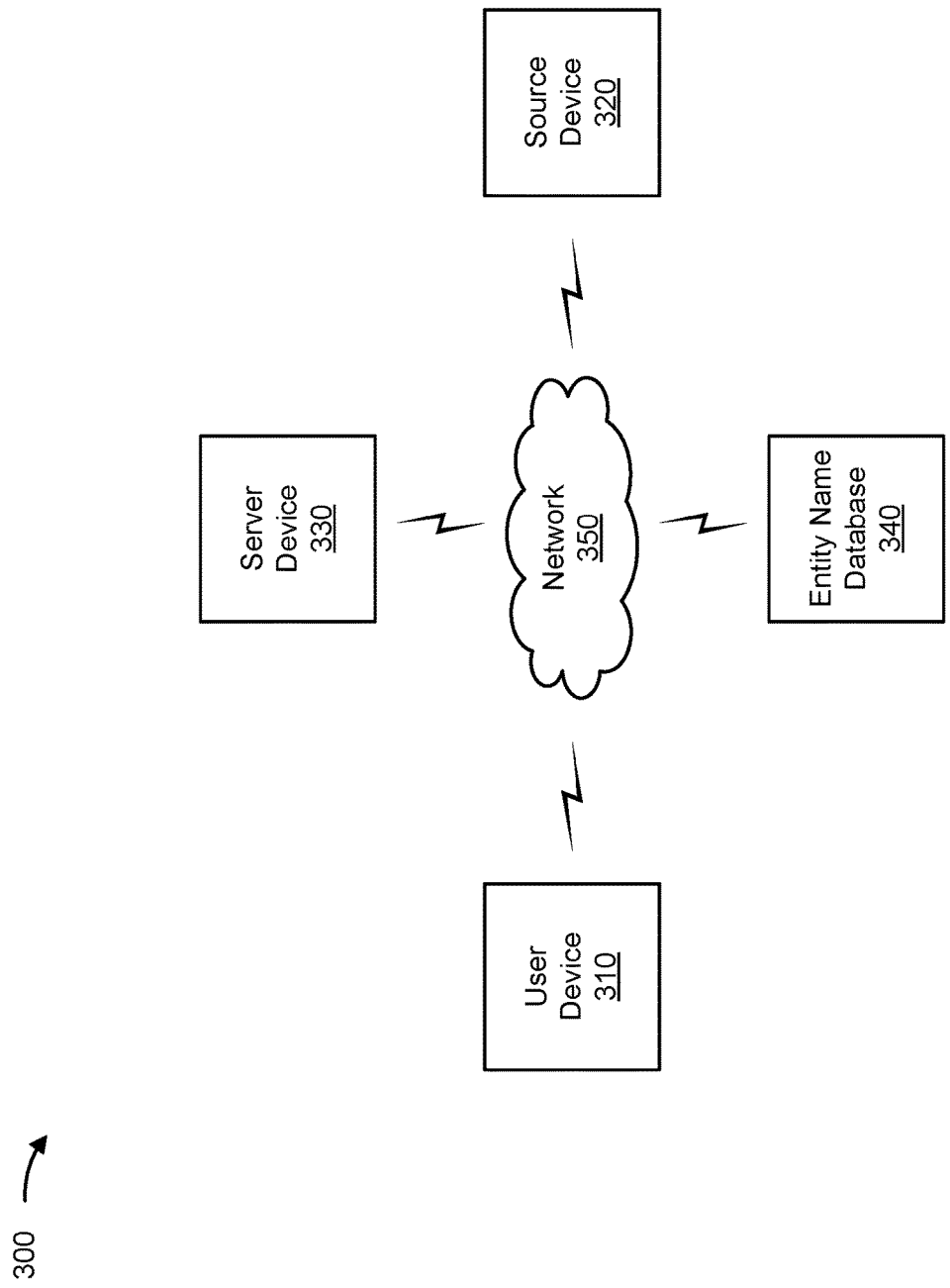
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a user device 310, a source device 320, a server device 330, an entity name database 340, and a network 350. Devices of environment 300 may interconnect via wired connections, wireless connections, or a combination of wired and wireless connections.

The user device 310 may include one or more devices capable of receiving, generating, storing, processing, and/or providing information associated with entity name audio-to-text translation, as described elsewhere herein, the user device 310 may include a communication device and/or a computing device. For example, the user device 310 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The source device 320 may include one or more devices capable of receiving, generating, storing, processing, and/or providing information associated with entity name audio-to-text translation, as described elsewhere herein. The source device 320 may include a communication device and/or a computing device. For example, the source device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 330 may include one or more devices capable of receiving, generating, storing, processing, providing, and/or routing information associated with entity name audio-to-text translation, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 may include computing hardware used in a cloud computing environment.

The entity name database 340 may include one or more devices capable of receiving, generating, storing, processing, and/or providing information associated with entity name audio-to-text translation, as described elsewhere herein. The entity name database 340 may include a communication device and/or a computing device. For example, the entity name database 340 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the entity name database 340 may store entity names and respective identifiers (e.g., phone numbers and/or other identifiers), as described elsewhere herein.

The network 350 may include one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
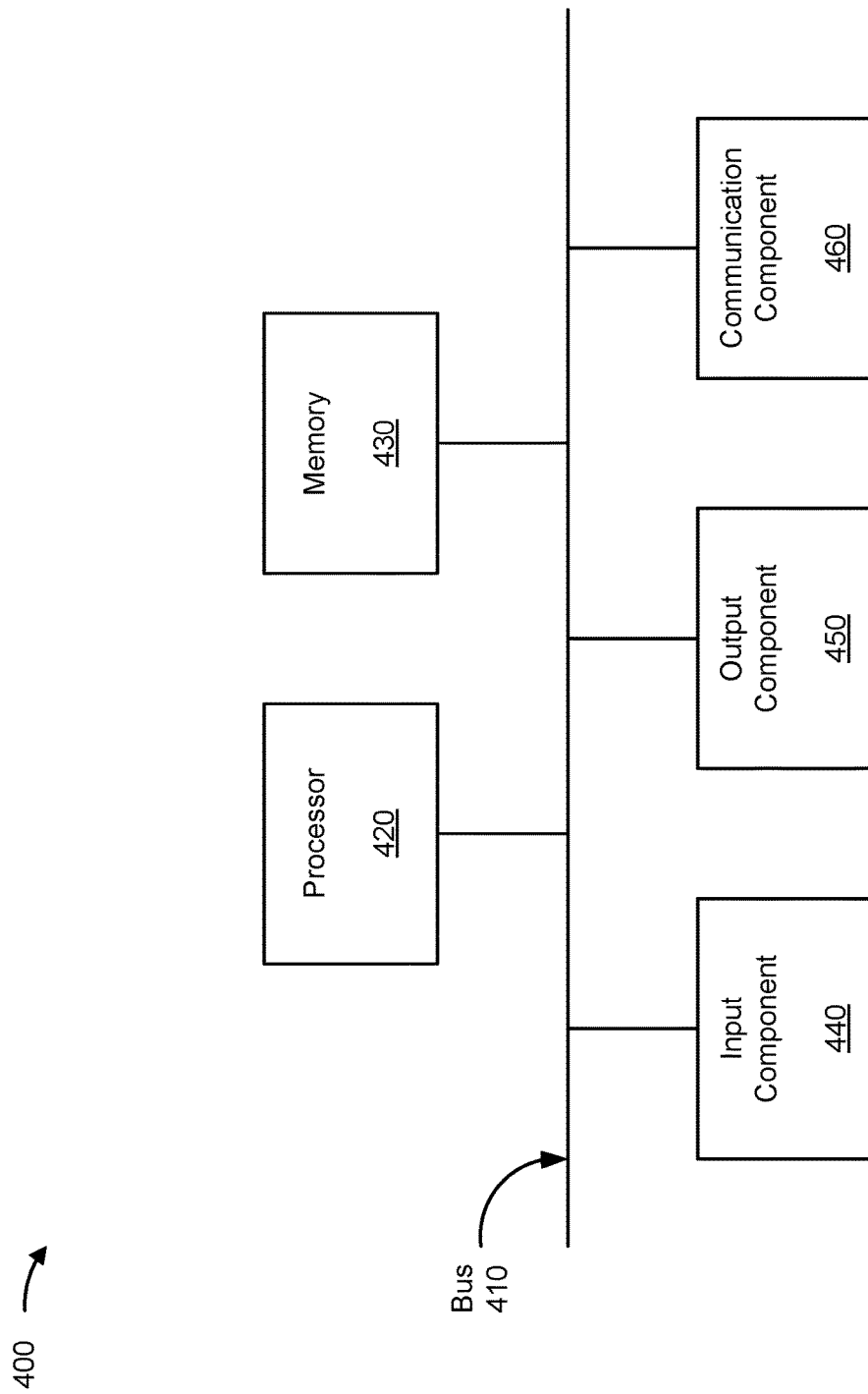
FIG. 4 is a diagram of example components of a device associated with entity name audio-to-text translation, in accordance with some embodiments of the present disclosure.

FIG. 4 is a diagram of example components of a device 400 associated with entity name audio-to-text translation. The device 400 may correspond to the user device 310, the source device 320, the server device 330, and/or the entity name database 340. In some implementations, the user device 310, the source device 320, the server device 330, and/or the entity name database 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
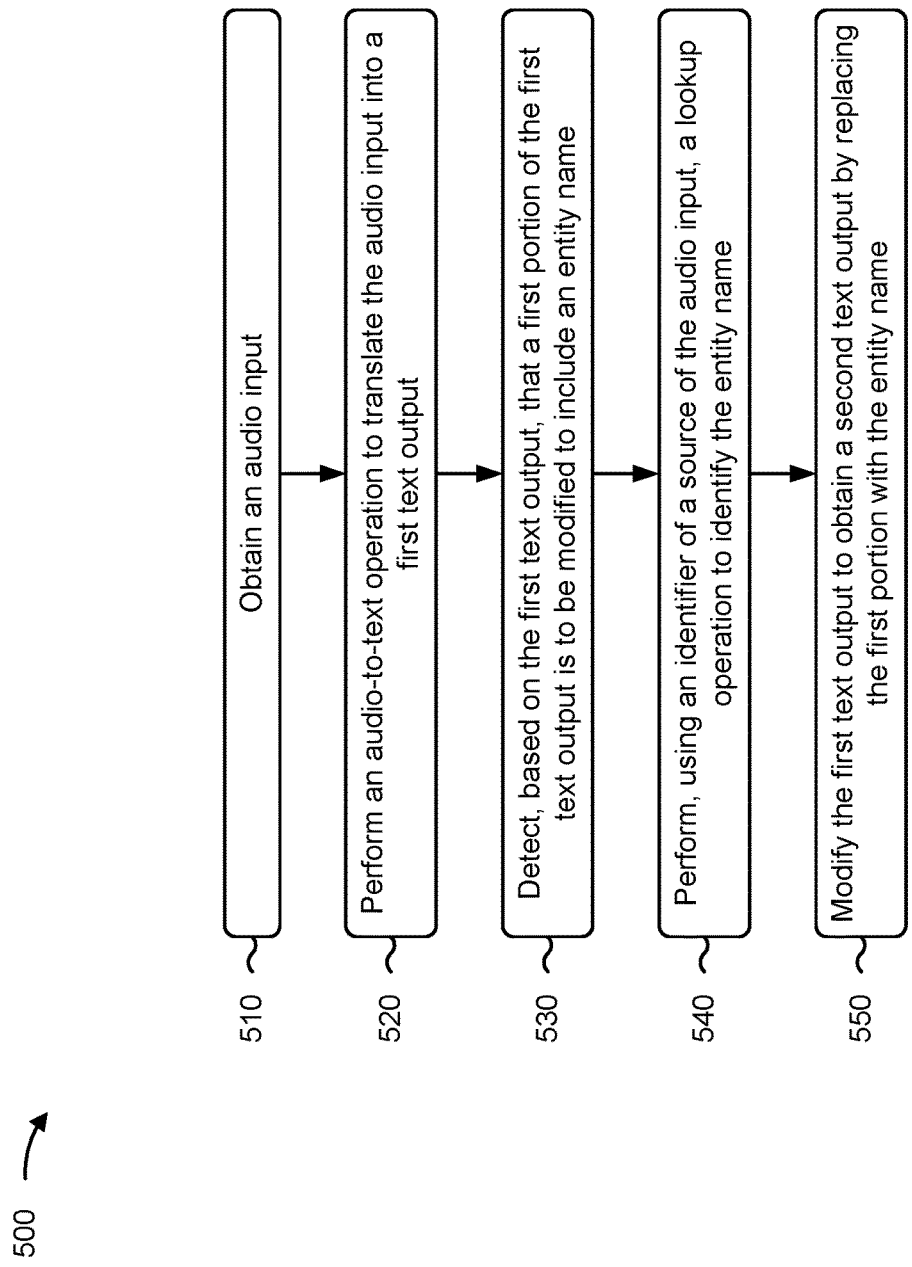
FIG. 5 is a flowchart of an example process associated with entity name audio-to-text translation, in accordance with some embodiments of the present disclosure.

FIG. 5 is a flowchart of an example process 500 associated with entity name audio-to-text translation. In some implementations, one or more process blocks of FIG. 5 may be performed by the user device 310. In some implementations, one or more process blocks of FIG. 5 may be performed by another device or a group of devices separate from or including the user device 310, such as the source device 320, the server device 330, and/or the entity name database 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining an audio input (block 510). For example, the user device 310 (e.g., using processor 420 and/or memory 430) may obtain an audio input, as described above in connection with reference number 105 of FIG. 1A. As an example, the user device 310 may obtain the audio input via the source device 320.

As further shown in FIG. 5, process 500 may include performing an audio-to-text operation to translate the audio input into a first text output (block 520). For example, the user device 310 (e.g., using processor 420 and/or memory 430) may perform an audio-to-text operation to translate the audio input into a first text output, as described above in connection with reference number 110 of FIG. 1A. As an example, the user device 310 may use a machine learning model to translate of convert the audio input into the first text output. The first text output may include one or more words or phrases.

As further shown in FIG. 5, process 500 may include detecting that a first portion of the first text output is to be modified to include an entity name (block 530). For example, the user device 310 (e.g., using processor 420 and/or memory 430) may detect that a first portion of the first text output is to be modified to include an entity name, as described above in connection with reference numbers 120, 130, 135, and/or 140 of FIG. 1B. As an example, the user device 310 may detect that the first portion (e.g., the portion 125) is to be modified to include an entity name based on performing NER of the first text output (e.g., the first text output 115) to detect that the first text output includes an entity name and based on detecting that the first text output is not logically coherent.

As further shown in FIG. 5, process 500 may include performing, using an identifier of a source of the audio input, a lookup operation to identify the entity name (block 540). For example, the user device 310 (e.g., using processor 420 and/or memory 430) may perform, using an identifier of a source of the audio input, a lookup operation to identify the entity name, as described above in connection with reference number 145 and/or 150 of FIG. 1C. As an example, the user device 310 may search the entity name database using the identifier to identify the entity name.

As further shown in FIG. 5, process 500 may include modifying the first text output to obtain a second text output by replacing the first portion with the entity name (block 550). For example, the user device 310 (e.g., using processor 420 and/or memory 430) may modify the first text output to obtain a second text output by replacing the first portion with the entity name, as described above in connection with reference number 170 of FIG. 1D. As an example, the user device 310 may remove the first portion (e.g., the portion 125) and insert the entity name into the first text output (e.g., in place of the first portion) to generate the second text output.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system for entity name audio-to-text translation, the system comprising:
one or more memories; and
one or more processors, communicatively coupled to the one or more memories, configured to:
perform an audio-to-text operation to translate an audio input into a first text output;
detect, based on the first text output and using named entity recognition, that a first portion of the first text output is associated with an entity name,
wherein the first portion includes one or more words associated with a confidence score that does not satisfy a confidence threshold, and
wherein the confidence threshold indicates a likelihood that the audio-to-text operation correctly translated the first portion from the audio input;
determine, based on comparing the first portion to one or more other portions of the first text output that are adjacent to the first portion, one or more adjacency scores,
wherein the one or more adjacency scores indicate a confidence level that the first portion and respective portions from the one or more other portions should be adjacent logically;
determine, based on at least one of the one or more adjacency scores not satisfying an adjacency threshold and using an identifier of a source of the audio input, the entity name;
modify the first text output to obtain a second text output by replacing the first portion with the entity name; and
provide, for display, the second text output.

2. The system of claim 1, wherein the one or more processors are further configured to:
determine, via semantic analysis of the first text output, a first semantic meaning score associated with the first text output,
wherein the first semantic meaning score indicates a confidence level that the first text output is logically coherent, and wherein determining the entity name is based on the first semantic meaning score not satisfying a coherency threshold.

3. The system of claim 2, wherein the one or more processors are further configured to:
modify, based on the first semantic meaning score not satisfying the coherency threshold, the first text output to obtain a third text output by replacing the first portion with a generic entity name; and
determine, via the semantic analysis of the first text output, a second semantic meaning score associated with the third text output,
wherein determining the entity name is further based on the second semantic meaning score satisfying the coherency threshold.

4. The system of claim 1, wherein the identifier is a phone number.

5. The system of claim 1, wherein the one or more processors, to perform the audio-to-text operation, are further configured to:
perform, via a machine learning model, the audio-to-text operation; and wherein the one or more processors, to determine the entity name, are configured to:
determine, via the machine learning model, the entity name using the identifier.

6. The system of claim 5, wherein an input to the machine learning model is the audio input and an output of the machine learning model is the second text output.

7. The system of claim 1, wherein the one or more processors, to determine the entity name, are configured to:
perform, using the identifier, a lookup operation in a database to determine the entity name.

8. A method of entity name audio-to-text translation, comprising:
obtaining, by a device, an audio input;
performing, by the device, an audio-to-text operation to translate the audio input into a first text output;
detecting, by the device based on the first text output, that a first portion of the first text output is to be modified to include an entity name;
determining, based on comparing the first portion to one or more other portions of the first text output that are adjacent to the first portion, one or more adjacency scores,
wherein the one or more adjacency scores indicate a confidence level that the first portion and respective portions from the one or more other portions should be adjacent logically;
performing, by the device, based on at least one of the one or more adjacency scores not satisfying an adjacency threshold, and using an identifier of a source of the audio input, a lookup operation to identify the entity name; and
modifying, by the device, the first text output to obtain a second text output by replacing the first portion with the entity name.

9. The method of claim 8, wherein the first portion includes one or more words associated with a confidence score that does not satisfy a confidence threshold,
wherein the confidence score indicates a likelihood that the audio-to-text operation correctly translated the first portion from the audio input, and
wherein detecting that the first portion of the first text output is to be modified to include the entity name is based on the confidence score not satisfying the confidence threshold.

10. The method of claim 8, wherein performing the lookup operation to identify the entity name comprises:
searching, using the identifier, an entity name database to identify the entity name.

11. The method of claim 8, further comprising:
obtaining a first audio signal associated with the entity name; and
comparing the first audio signal to a portion of the audio input corresponding to the first portion to obtain a similarity score,
wherein modifying the first text output to obtain the second text output is based on the similarity score satisfying a similarity threshold.

12. The method of claim 8, further comprising:
wherein the first portion includes one or more words associated with a confidence score that does not satisfy a confidence threshold, and
wherein the confidence threshold indicates a likelihood that the audio-to-text operation correctly translated the first portion from the audio input;
determine, using an identifier of a source of the audio input, the entity name;
modify the first text output to obtain a second text output by replacing the first portion with the entity name; and
provide, for display, the second text output.

13. The method of claim 8, wherein performing the audio-to-text operation comprises: performing the audio-to-text operation using a spectrogram of the audio input.

14. The method of claim 8, wherein the identifier includes at least one of:
- a username,
- an internet protocol (IP) address, or
- an email address.

15. The method of claim 8, wherein the identifier is a phone number.

16. A non-transitory computer-readable medium storing a set of instructions, the set of instructions comprising:
one or more instructions that, when executed by one or more processors of a device, cause the device to:
perform an audio-to-text operation to translate an audio input into a first text output;
detect, based on the first text output and using named entity recognition, that a first portion of the first text output is associated with an entity name,
wherein the first portion includes one or more words associated with a confidence score that does not satisfy a confidence threshold, and
wherein the confidence threshold indicates a likelihood that the audio-to-text operation correctly translated the first portion from the audio input;
determine, based on comparing the first portion to one or more other portions of the first text output that are adjacent to the first portion, one or more adjacency scores,
wherein the one or more adjacency scores indicate a confidence level that the first portion and respective portions from the one or more other portions should be adjacent logically;
determine, based on at least one of the one or more adjacency scores not satisfying an adjacency threshold and using an identifier of a source of the audio input, the entity name;
modify the first text output to obtain a second text output by replacing the first portion with the entity name; and
provide, for display, the second text output.

17. The non-transitory computer-readable medium of claim 16, wherein the one or more instructions, that cause the device to determine the entity name, cause the device to:
transmit, to a server device, an indication of the identifier; and
receive, from the device, an indication of the entity name.

18. The non-transitory computer-readable medium of claim 16, wherein the one or more instructions further cause the device to:
determine a first semantic meaning score associated with the first text output,
wherein the first semantic meaning score indicates a confidence level that the first text output is logically coherent, and
wherein determining the entity name is based on the first semantic meaning score not satisfying a coherency threshold.

19. The non-transitory computer-readable medium of claim 16, wherein the one or more instructions, that cause the device to perform the audio-to-text operation, cause the device to:
perform, via a machine learning model, the audio-to-text operation; and
wherein the one or more instructions, that cause the device to determine the entity name, cause the device to:
determine, via the machine learning model, the entity name using the identifier.

20. The non-transitory computer-readable medium of claim 19, wherein the machine learning model is a multi-task model.

* * * * *